United States Patent
Devireddy et al.

(10) Patent No.: US 11,075,883 B2
(45) Date of Patent: Jul. 27, 2021

(54) RESOURCE-PATH-BASED, DYNAMIC GROUP MEMBERSHIP SUPPORT FOR MEMBERSHIP GROUPS

(71) Applicant: VMware, Inc., Palo Alto, CA (US)

(72) Inventors: Dileep Devireddy, San Jose, CA (US); Hitesh Patel, Newark, CA (US)

(73) Assignee: VMware, Inc., Palo Alto, CA (US)

( * ) Notice: Subject to any disclaimer, the term of this patent is extended or adjusted under 35 U.S.C. 154(b) by 182 days.

(21) Appl. No.: 16/394,898

(22) Filed: Apr. 25, 2019

(65) Prior Publication Data

US 2020/0344212 A1    Oct. 29, 2020

(51) Int. Cl.
*H04L 29/06*    (2006.01)

(52) U.S. Cl.
CPC ...... *H04L 63/0263* (2013.01); *H04L 63/0236* (2013.01); *H04L 63/104* (2013.01); *H04L 63/20* (2013.01)

(58) Field of Classification Search
CPC ............. H04L 63/0227; H04L 63/0254; H04L 63/0263; H04L 63/10; H04L 63/101; H04L 63/102; H04L 63/104; H04L 63/108; H04L 63/20; H04L 63/205
See application file for complete search history.

(56) References Cited

U.S. PATENT DOCUMENTS

| 2014/0215043 A1* | 7/2014 | Ryu | G06F 16/955 709/223 |
| 2015/0089061 A1* | 3/2015 | Li | H04W 4/70 709/226 |

OTHER PUBLICATIONS

Limor Wainstein, "Synchronizing AWS S3—an Overview", dated Jan. 30, 2018 2018, 3 pages.
WhatIsMyIPAddress, "Classless inter-domain routing (CIDR) and Notation for Beginners", dated 2000-2019, 4 pages.

\* cited by examiner

*Primary Examiner* — Edward Zee (57) ABSTRACT

In an embodiment, a computer-implemented method for providing dynamic mechanisms for resource-path-based, dynamic group membership support for local and external membership groups is described. A method comprises: detecting, by a group resolver implemented in a management and control plane, that information about an object stored in the plane was created or updated; determining whether a URI of the object matches a URI regular expression and other conditions specified in membership criteria created for a membership group; in response to determining that a URI of the object matches a URI regular expression and other conditions specified in membership criteria created for a membership group: distributing the information about the object to network agents implemented in transport nodes to cause the network agents to automatically update a group membership policy associated with the membership group; and wherein the group membership policy affects packet forwarding behavior of a forwarding node.

20 Claims, 9 Drawing Sheets

---

652 Detect that a URI Name Associated with a Predefined Object Matches a URI Name of a Group Created by a Security Administrator

654 Update All Groups Matching the Updated URI Object

656 Distribute the Updated Group(s) Members to Network Agents Implemented in Transport Nodes to Cause Network Agents Update the DataPath Policy and/or Groups with the Updated Membership Information

| 410 Network Administrator | 420 Security Administrator | 430 Group Resolver |
|---|---|---|
| • Create a logical router with a production_router as an identifier. The router will be identified using /infra/networking/router/production_router<br>• Create a L2 network with CIDR 10.9.1.0/24 and attach the logical router to production_router<br>• Create a L2 network with CIDR 10.9.2.0/24 and attach to the production_router of the logical router | • Create a group_production<br>• Create a membership criterion with a regular expression /infra/networking/router/production*, condition, and store as attached networks<br>• Add a name, e.g., "Production Router"<br>• Store the membership policy in a group configuration module in a management plane | • Detect that the modified router object and match the object URI with the regular expression in the group membership criteria<br>• Update the group membership with attached L2 networks 10.9.1.9/24 and 10.9.2.9/24<br>• Distribute the IP subnet of group production to a networking agent on an edge transport node and on a hypervisor |

452 Detect that a Router Object Name Matches an Object Name in the URI-Based Matching Criteria and Update the Group Membership with Attached L2 networks (for example, 10.9.1.0/24 and 10.9.2.0/24)

454 Distribute the IP Subnet of a Group Production to a Networking Agents on Edge Transport Nodes and Hypervisors

| 410 Network Admin | 150 Edge Transport Node | 420 Security Admin | 430 Group Resolver |
|---|---|---|---|
| • Configure a BGP session to a remote, partner-1 site<br>• Distribute the BGP configuration session to an Edge Transport Node | • Establish a BGP session to the remote partner-1 site using the provided configuration<br>• Receive prefixes and other attributes over the BGP session (e.g., from Partner-1)<br>• Communicate the prefixes and other attributes to management and control planes. This data will be uniquely identified in the management and control planes using a URI of /infra/networking/routing-protocol/bgp/partner-site-1/runtime | • Create a group with Match Criteria (e.g., Partner-1)<br>• Define a membership policy for the group using /infra/networking/routing-protocol/bgp/partner-site-1/runtime as a URI regular expression for matching | • Update the Group Members of the Groups Based on the Match Criteria<br>• Distribute the Updated group(s) Members to Network agents on Transport Nodes to cause the Network Agent on Hypervisor to update DataPath Policy and the Network Agent on the Edge to Update the Rules |

| 610 External Service | 420 Security Administrator | 430 Group Resolver |
|---|---|---|
| | • Define the Group Membership Policy Based on Predefined Object URIs (e.g., S3 Prefix List) | |
| • Update the Objects Using the URI | | • Detect that the Predefined Object URI Matches the URI of the Membership Group<br>• Distribute the Updated Group(s) Members to Network Agent on Transport Nodes to Cause Network Agents to Update the DataPath Policy and/or Groups with the Updated Membership Information |

FIG. 6B

652 Detect that a URI Name Associated with a Predefined Object Matches a URI Name of a Group Created by a Security Administrator

↓

654 Update All Groups Matching the Updated URI Object

↓

656 Distribute the Updated Group(s) Members to Network Agents Implemented in Transport Nodes to Cause Network Agents Update the DataPath Policy and/or Groups with the Updated Membership Information

RESOURCE-PATH-BASED, DYNAMIC GROUP MEMBERSHIP SUPPORT FOR MEMBERSHIP GROUPS

BACKGROUND

Firewall membership groups can be static, dynamic, or mixed. Static groups are usually inflexible and difficult to manage. To create a static group, a security administrator specifies a membership group and manually enumerates each IP address and each subnet that belongs to the group. That is inconvenient and time consuming, especially if needs to be repeated for hundreds of groups.

Dynamic groups provide some flexibility and scalability. However, managing the dynamic groups requires tagging the objects. To tag the objects, a security administrator needs to determine the names of all objects that should belong to the groups and use the object names as explicit tags. Then, the security administrator needs to specify the membership criteria and create the membership groups based on the criteria and the tags. Since the current technologies associate tags with only virtual machines ("VMs"), the tagging process can be used only for the groups that include only VMs and VM names. That, however, does not allow specifying dynamic groups for non-VM members such as external networks or external services.

Indeed, traditional solutions do not allow creating cross-network membership groups dynamically and automatically and based on dynamically changing membership criteria. The traditional approaches have difficulties in reflecting, in the membership groups, the dynamically changing configurations of the local networks, external networks, and external services.

Furthermore, the traditional approaches do not allow creating membership groups based on dynamically changing configuration objects that represent logical networks behind tier-1 gateways. The traditional approaches do not allow creating membership groups based on dynamic runtime states of external entities. Moreover, the approaches do not allow creating membership groups based on dynamic objects referencing external services provided by partner sites.

SUMMARY

In an embodiment, an approach provides dynamic mechanisms for resource-path-based, dynamic group membership support for local and external membership groups. The approach is applicable to various types of membership groups, including firewall groups. While the approach is described herein mostly in reference to the firewall groups, the provided examples may be easily extended to other types of groups.

The dynamic mechanisms described herein allow expressing firewall policies dynamically and flexibly. As members in a membership group are added, removed or modified, the mechanisms automatically and dynamically update the membership associations. The described mechanisms allow to dynamically collect information about the changes in configurations of the local and external networks and to manage the membership groups dynamically and efficiently.

The dynamic mechanisms allow creating group memberships based on dynamic configuration objects, dynamic runtime states, and predefined reference objects. The dynamic configuration objects may be created by network administrators and may represent logical routers or other logical components configured in a network. The dynamic runtime states represent the states of connectivity between external entities and datacenters. The predefined reference objects represent external services that may be accessible via, for example, simple storage service ("S3") prefixes, which are described in detail later.

In an embodiment, the dynamic mechanisms for supporting dynamic membership groups use resource paths. An example of a resource path is a uniform resource identifier ("URI") path. A URI is a string of characters that unambiguously identifies a resource. To guarantee uniformity, all URIs herein follow predefined syntax rules. An example URI may include a plurality of object identifiers separated by backslashes, such as in /infra/networking/router/production.

In an embodiment, the dynamic mechanisms use URI-based matching criteria to reflect the changes in configurations of objects, external networks and subnets, and external services. The changes are used to dynamically update membership group policies. Matching criteria include URIs with regular expressions for identifying the objects. If the URI expression and the object URI match within a specified expression, then the object is used to evaluate other conditions for membership criteria. The group is updated if all the membership criteria match.

In an embodiment, the dynamic mechanisms are implemented in a group resolver. A group resolver may be a software-based module configured in management and control planes. The management and control planes are modules configured to manage a virtualized computer network. The group resolver may be configured to find matches between matching criteria and URIs of configuration objects, URIs of external services, or URIs of external partner sites.

In an embodiment, a group resolver receives a notification with all internal runtime object updates. Upon receiving a notification, the group resolver may identify the object to which the notification pertains and try to match the object identifier with a regular URI expression of the URI-based membership criteria. If a match is found, then the group resolver may validate the conditions included in the regular expression URI with respect to the object. Once the conditions are validated, the group resolve may use the content of a specified field in the updated object to dynamically update the membership group.

In an embodiment, an approach allows overcoming the shortcomings of the traditional approaches because it allows to reference group members regardless of whether they are implemented in local or external networks. Furthermore, the approach overcomes the need to have a security administrator manually update the membership groups and manually tag the objects.

Furthermore, the approach allows a classless inter-domain routing ("CIDR") behind an interface or a VPN tunnel. The approach allows to reference the CIDRs which themselves can be dynamic, and thus unknown upfront. According to the presented approach, the CIDRs may be learned using, for example, functionalities of the border gateway protocol ("BGP"), and the learned CIDR information may be used to create and modify the firewall membership groups dynamically and automatically.

Moreover, the approach enables outbound communications to membership groups that include external partner sites and external services. For example, the approach allows outbound communications with the cloud environment in which providers offer shared services, such as an S3 option that may be available via the Amazon Web Services ("AWS"). An S3 service address itself is dynamic and a list of IPs prefixes used as the S3 addresses may be periodically updated by the service provider. The presented approach provides mechanisms for determining the up-to-date S3 IP addresses associated with the S3 service and updating the corresponding group members with the S3 IP prefixes dynamically and automatically.

The dynamic aspect of the described mechanisms provides improvements in the way the firewalls are managed. With the presented mechanisms, the firewall and firewall policies may be dynamically and efficiently managed, while without the presented mechanisms, each change pertaining to a membership group definition would have to be individually detected and manually implemented. If a datacenter supports millions of membership groups, updating the changes manually is simply impossible.

DETAILED DESCRIPTION

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

1. EXAMPLE PHYSICAL IMPLEMENTATIONS

Figure 1:
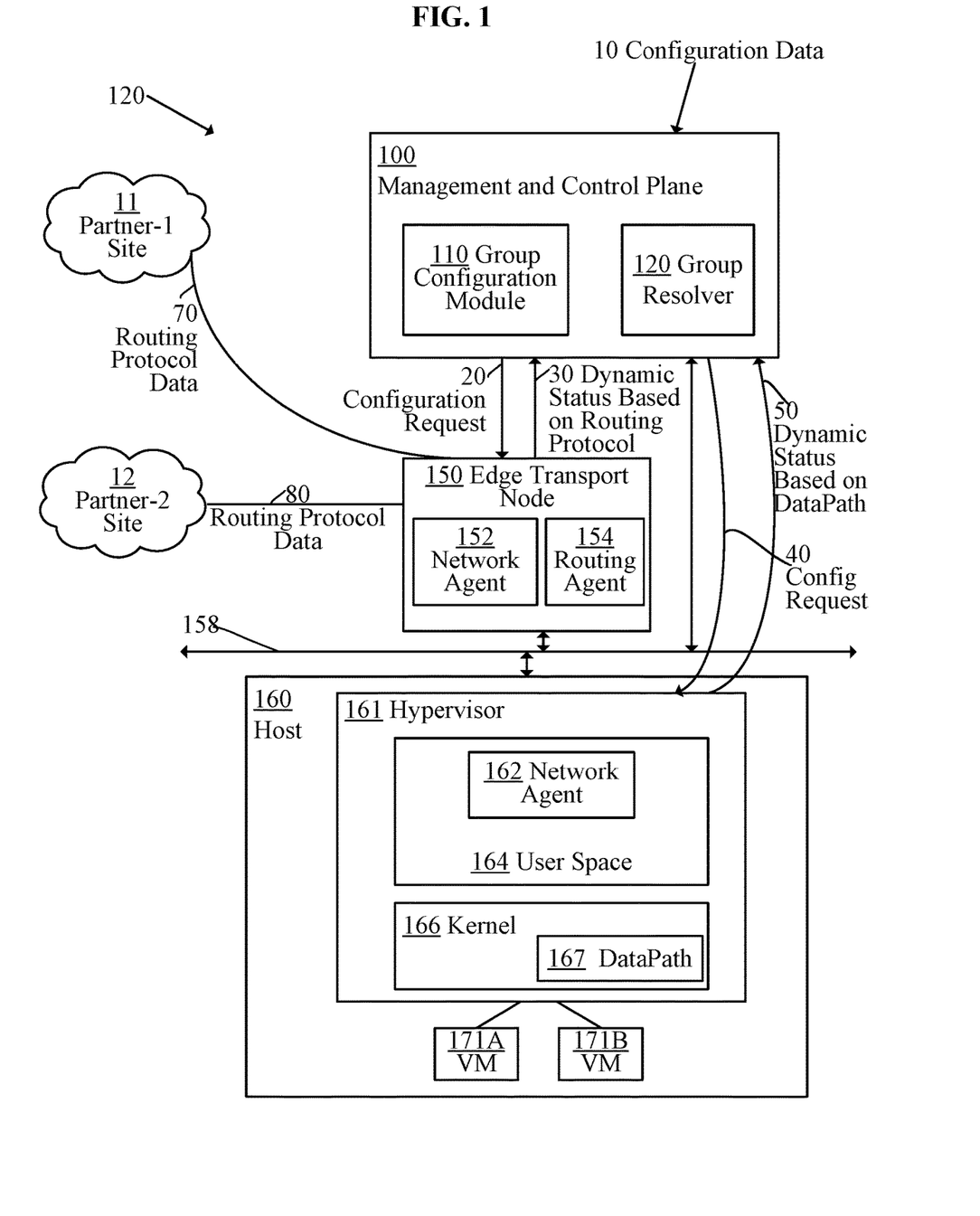
FIG. 1 is a block diagram depicting an example physical implementation view of an example logical network environment for implementing dynamic mechanisms for resource-path-based, dynamic group membership support for membership groups.

FIG. 1 is a block diagram depicting an example physical implementation view 120 of an example logical network environment for implementing dynamic mechanisms for resource-path-based, dynamic group membership support for membership groups. The example implementation includes management and control planes 100, one or more hosts 160, and one or more partner sites 11 and 12. The configuration may include additional datacenters and additional sites. Hosts 160 may communicate with one or more edge transport nodes 150 via multiple physical networks 158.

Datacenter 120 may include a variety of components including a plurality of hosts 160 (only one shown) each having hypervisor 161 and one or more virtual machines such as a VM 171A and a VM 171B. Network 158 may include packet forwarding elements (not shown) such as routers and switches, additional gateways (not shown), and the like.

Hypervisor 161 is a software layer or component that supports the execution of VMs. Hypervisor 161 may also be configured to implement virtual switches and forwarding tables (not shown) that facilitate traffic between the VMs. In certain embodiments, the virtual switches and other components may reside in a privileged VM, sometimes referred to as a "Domain Zero" or a "root partition" (not shown), according to the architecture of the hypervisor. Hypervisor 161 may also maintain a mapping between underlying hardware components of host 161 and virtual resources allocated to the respective VMs. The hardware components may include computer processors, memory units, physical network interface cards, and storage devices.

VMs 171A-B are examples of virtualized computing instances or workloads. A virtualized computing instance may include an addressable data compute node or an isolated user space instance, often referred to as a name space container. Virtual machines may implement edge nodes, edge node gateways, and the like.

Management and control planes 100 (shown collectively as a combination of separate management and control planes) may be configured to receive configuration data 10 from network and security administrators or automated orchestrator systems (not shown) distribute the data to local agents and receive updated information from the agents.

Management and control plane 100 may include a group configuration module 110 and a group resolver 120. Group configuration module 110 may be used to receive, from a security administrator or an orchestrator, membership group criteria for membership groups. Group configuration module 110 may be also used to receive updates about group members.

Group resolver 120 may be used to detect whether any object identifiers created by, for example, a network administrator match any object identifiers in the URI-based matching criteria, and if a match is found, distribute the information specific to the match to a network agent 152 and/or a network agent 162.

Network agent 152 may be configured in an edge transport node 150. Edge transport node 150 may be implemented as a physical server in datacenter 120 as shown, or as another VM running on host 160 or on another host in datacenter 120. Edge transport node 150 may implement various network services affecting north-south traffic. In one embodiment, edge transport node 150 implements a stateless firewall (not shown). Network agent 152 may be configured to receive, from group resolver 120, updated information about membership groups and group members, and use the updated information to update the firewall and the firewall rules that the firewall implements.

Network agent 162 may be configured in a user space 164 of hypervisor 161, although it is also possible to implement network agent 162 in kernel 166, or in a privileged VM. Network agent 162 may be configured to receive, from group resolver 120, updated information about membership groups and group members, and use the updated information to update, for example, datapath information stored in a datapath 167 of a hypervisor kernel 166.

Edge transport node 150 may be configured as an edge service gateway ("ESG") and may provide network edge security and gateway services to VMs 171A-B. Edge transport node 150 may be installed either as a logical, distributed router or as a service gateway. Edge transport node 150 may be configured to connect isolated sub-networks to shared networks by providing common gateway services such as DHCP, VPN, NAT, dynamic routing, and load balancing services. Edge transport node 150 may host network agent 152 and a routing agent 154.

In an embodiment, group configuration module 110, implemented in management and control plane 100, transmits a configuration request 20 to edge transport node 150 to request information about the configuration of components implemented in partner-1 site 11 and/or partner-2 site 12. In response to configuration request 20, edge transport node 150 may generate, based on data collected using functionalities of a routing protocol, a dynamic status report 30 and transmit report 30 to management and control plane 100. Report 30 may include, for example, information about attributes of external entities such as partner-1 site 11 and/or partner-2 site 12, runtime status of external entities, and/or updates for predefined objects representing external services provided by the partners sites.

To generate dynamic status report 30, edge transport node 150 may use the functionalities of routing protocols, such as the BGP, RIP, OSPF, and the like, to establish communications connections with partner-1 site 11 and/or partner-2 site 12. Using the functionalities of the routing protocols, edge transport node 150 may collect attributes associated with the sites. The collected attributes may include specifications of subnets associated with the sites. Each time edge transport node 150 receives request 20, edge transport node 150 collects the current or updated attributes and generates dynamic status response 30 to communicate the updates to management and control planes 100.

Upon receiving response 30, group resolver 120 may try to match the attribute object identifiers included in response 30 to the object identifiers in the URI-based matching criteria to determine if there is a match. If a match is found, then group resolver 120 may distribute the attribute information corresponding to the match to network agents 152 and 162.

In an embodiment, group configuration module 110, implemented in management and control planes 100, transmits a configuration request 40 to host 160 to request information about the configurations of components implemented in host 160. In response to configuration request 40, host 160 may collect relevant data, use the data to generate a dynamic status report 50 and transmit report 50 to management and control plane 100. Report 50 may include, for example, information about logical routers implemented in host 160, and/or updates of predefined objects representing services provided by transport nodes or sites. Host 160 may generate response 50 each time it receives request 40.

Upon receiving response 50, group resolver 120 may try to match the attribute object identifiers included in response 50 to the object identifiers in the URI-based matching criteria to determine if there is a match. If a match is found, then group resolver 120 may distribute the collected information corresponding to the match to network agents 152 and 162.

2. EXAMPLE MEMBERSHIP GROUPS

Figure 2:
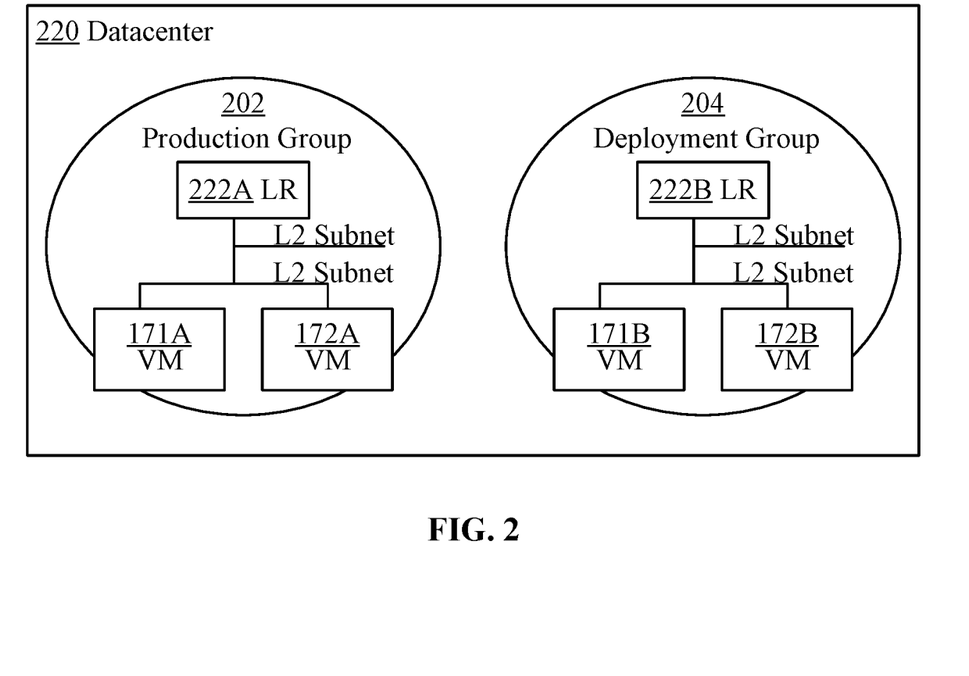
FIG. 2 is a block diagram depicting examples of membership groups.

FIG. 2 is a block diagram depicting examples of membership groups. In the depicted example, a datacenter 220 is configured to provide support for at least two separate membership groups: one group is called a production group 202, while the other is called a deployment group 204. The groups are separate, and datacenter 220 manages each of the groups separately. Thus, the communications to and from production group 202 are isolated from the communications to and from deployment group 204. To maintain the separation between the groups, a security administrator may create separate membership policy for each of the groups, and a firewall may implement different rules for each of the groups. The depicted groups are local to datacenter 220; however, as described later, the membership group may be defined across external entities and external services.

In FIG. 2, production group 202 is configured to develop and test new products and new releases of the products, while deployment group 204 is configured to deploy the new products and the new releases and put them into production. Production group 202 may include VM 171A and VM 172A, while deployment group 204 may include VM 171B, and VM 172B. The groups may have also assigned logical resources such as logical routers 222A, 222B, respectively, and corresponding network subnets. Other membership groups may include additional VMs and/or additional logical routers.

3. EXAMPLES OF URI-BASED MATCHING CRITERIA

Figure 3:
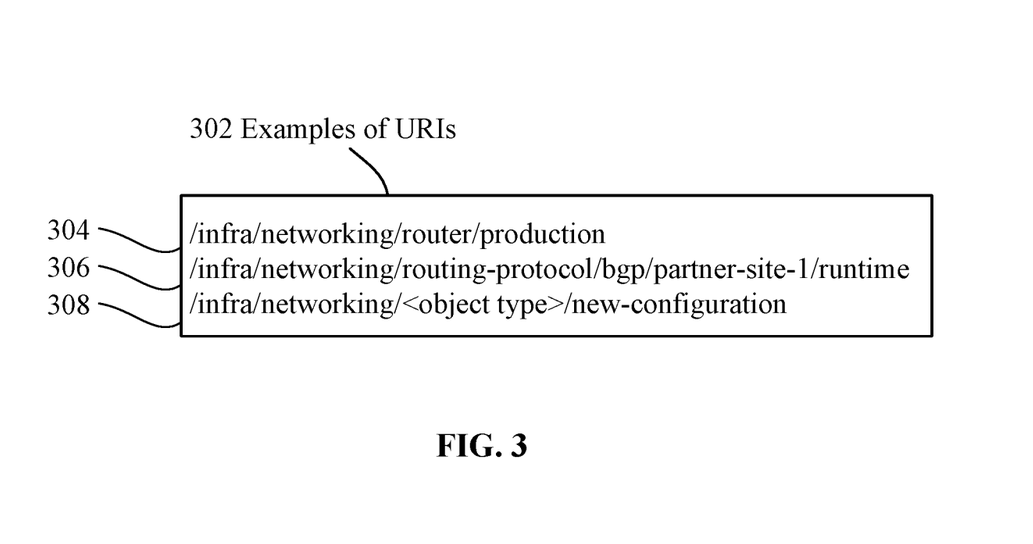
FIG. 3 is a block diagram depicting example URI-based matching criteria.

FIG. 3 is a block diagram depicting example URI-based matching criteria. The depicted examples are provided to illustrate the URIs that, among other things, are used to encode object identifiers of members of membership groups. The encoded object identifiers correspond to the object identifiers of members created by a security administrator and may be matched by a group resolver against object identifiers of configuration objects, object identifiers of external attributes of partner sites, and/or object identifiers of external services.

Examples 302 of the URI-based matching criteria include an /infra/networking/router/Production URI 304, an /infra/networking/routing-protocol/bgp/partner-site-1/runtime URI 306, and an /infra/networking/<object type>/new-configuration URI 308. URI 304 includes matching criteria for a membership group called "production," and refers to a configuration object called "router." URI 306 includes matching criteria for a membership group called "runtime." URI 308 includes matching criteria for a predefined membership object called "new-configuration."

4. DYNAMIC GROUP MEMBERSHIP SUPPORT FOR LOCAL MEMBERSHIP GROUPS

In one implementation, a group resolver matches object identifiers included in URI-based matching criteria created by a security administrator to object identifiers of configuration objects created locally by a network administrator. Examples of configuration objects may include logical routers. If the group resolver detects a match between an object identifier in the URI-based group criteria and a name of the configuration object, then the group resolver distributes the information associated with the matching configuration object to network agents executing in transport nodes. In contrast, using traditional approaches, a security administrator would have to update the group membership manually each time a logical router is created or modified by a network administrator.

4.1. Time Chart

Figure 4A:
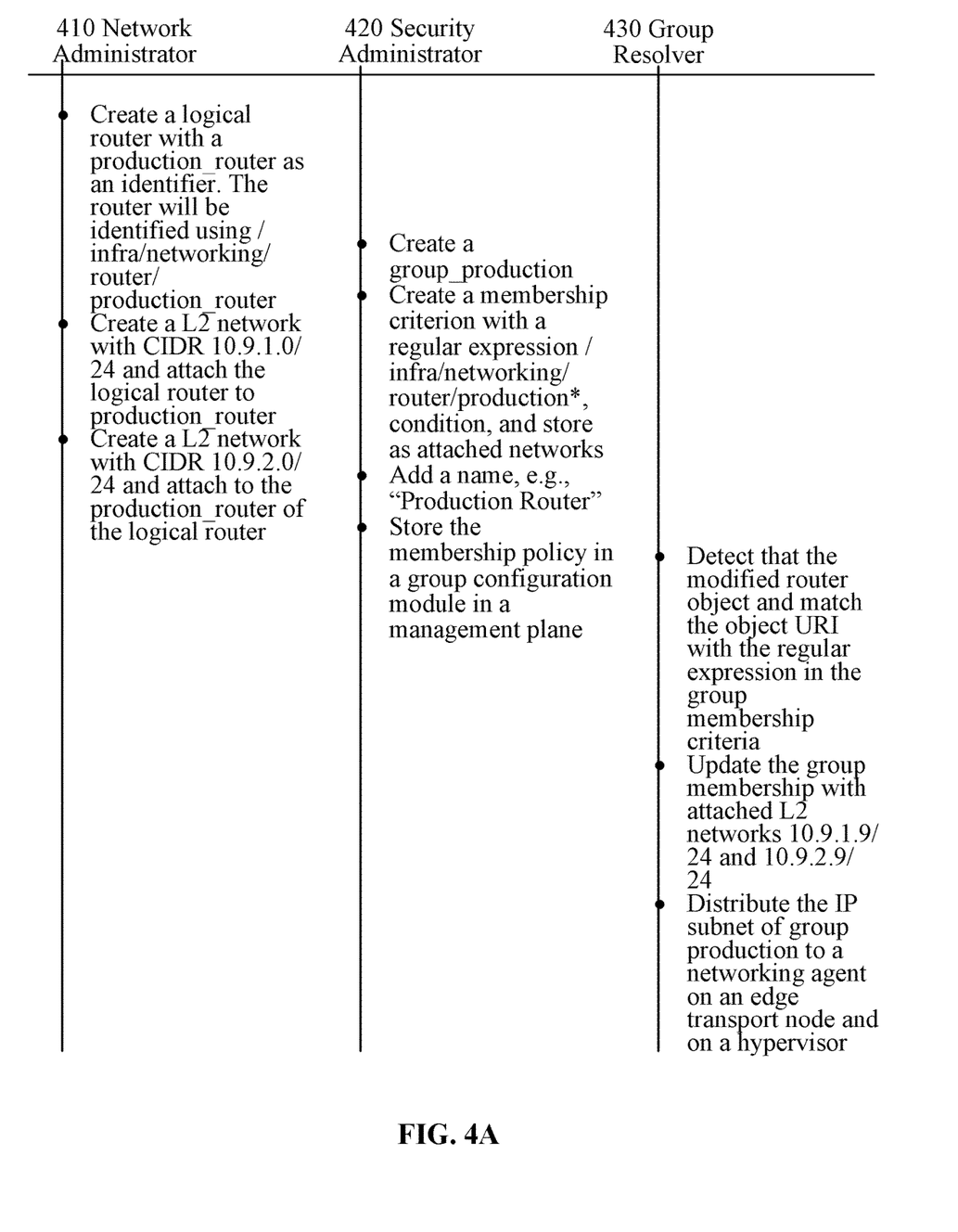
FIG. 4A is a block diagram depicting an example time chart for dynamic mechanisms for resource-path-based dynamic group membership support for local membership groups.

FIG. 4A is a block diagram depicting an example time chart for dynamic mechanisms for resource-path-based dynamic group membership support for local membership groups. The depicted example shows a network administrator 410, a security administrator 420, and a group resolver 430 cooperating with each other to provide support for the local membership groups.

In an embodiment, network administrator 410 creates a logical router and adds a name, or an identifier, to the logical router. Suppose that the object identifier is "production_router."

Next, network administrator 410 configures a network for the logical router named "production_router" and attaches a logical network with subnets 10.9.1.0/24 and 10.9.2.0/24 to the logical router production router.

Meanwhile, security administrator 420 creates a group called "production," refers the production_router in the group membership policy and stores the membership policy in a group configuration module in the management and configuration planes. The membership policy may be referenced using URI-based matching criteria, such as /infra/networking/router/production_router.

Once group resolver 430 detects, or is notified about, the URI of the logical routers and the URI-based matching criteria, group resolver 430 tries to determine whether any of the identifiers of the logical routers match the URI regular expression in the URI-based matching criteria. Upon detecting a match between the URI /infra/networking/router/production_router of the logical router and the URI regular expression in the URI-based matching criteria, group resolver 430 may validate other conditions in membership criteria and update the group membership. Then, then management and control plane 100 distributes the information about the group memberships to network agents 152 and 162, which are implemented in edge transport node 150 and hypervisor 161, respectively.

4.2. Flow Chart

Figure 4B:
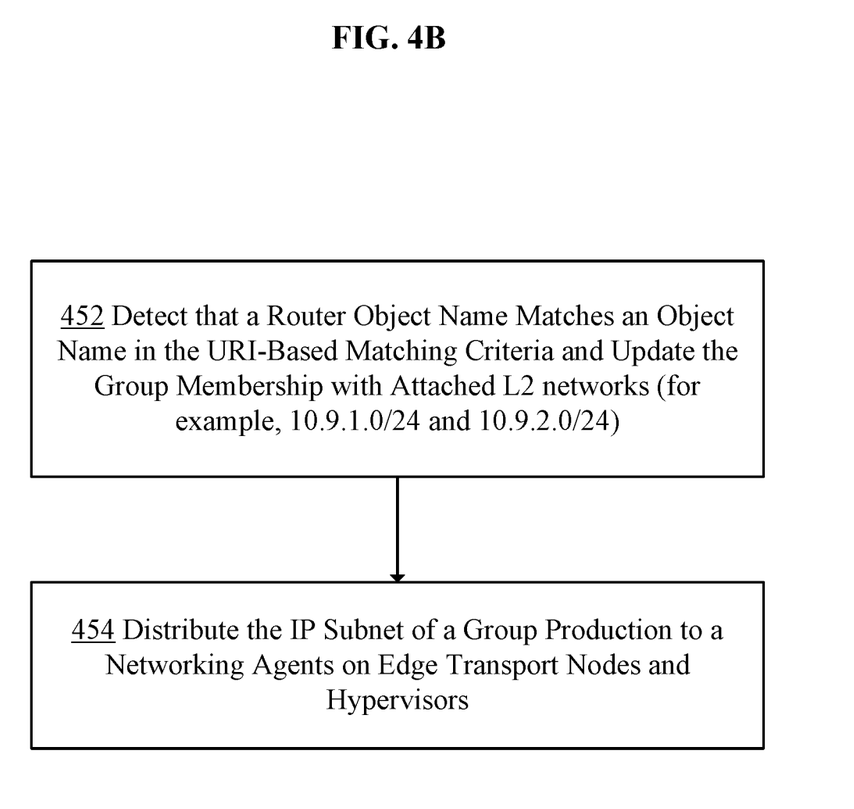
FIG. 4B is a flow chart for resource-path-based dynamic group membership support for local membership groups.

FIG. 4B is a flow chart for resource-path-based dynamic group membership support for local membership groups. In step 452, a group resolver detects that a network (i.e., one or more subnets) created by a network administrator is attached to a logical router whose object identifier matches an object identifier in URI-based matching criteria of a membership group defined by a security administrator. Upon finding the match between the of the logical router and the object identifier included in the URI-based matching criteria, the group resolver identifies the subnets attached to the logical router having the matching name.

In step 454, the group resolver distributes the information about the subnets attached to the logical router to network agents implemented in an edge transport node and in a hypervisor. Distributing the updated information about the group members to a network agent implemented in the edge transport node causes the network agent to update a firewall and the firewall rules implemented in the edge transport node. Distributing the updated information about the group members to a network agent implemented in the hypervisor causes the network agent to update the corresponding datapath policy implemented in the hypervisor.

5. DYNAMIC GROUP MEMBERSHIP SUPPORT FOR EXTERNAL GROUPS

5.1. Examples of External Groups

In an embodiment, a dynamic group membership approach provides support for external groups that include members such as external partners and external services. Since the information about the external partners and services is not readily available to the management and control planes, the information needs to be obtained and provided to the planes. This may be accomplished using the functionalities of routing protocols such as the BGP, RIP, OSPF, or others.

Figure 5A:
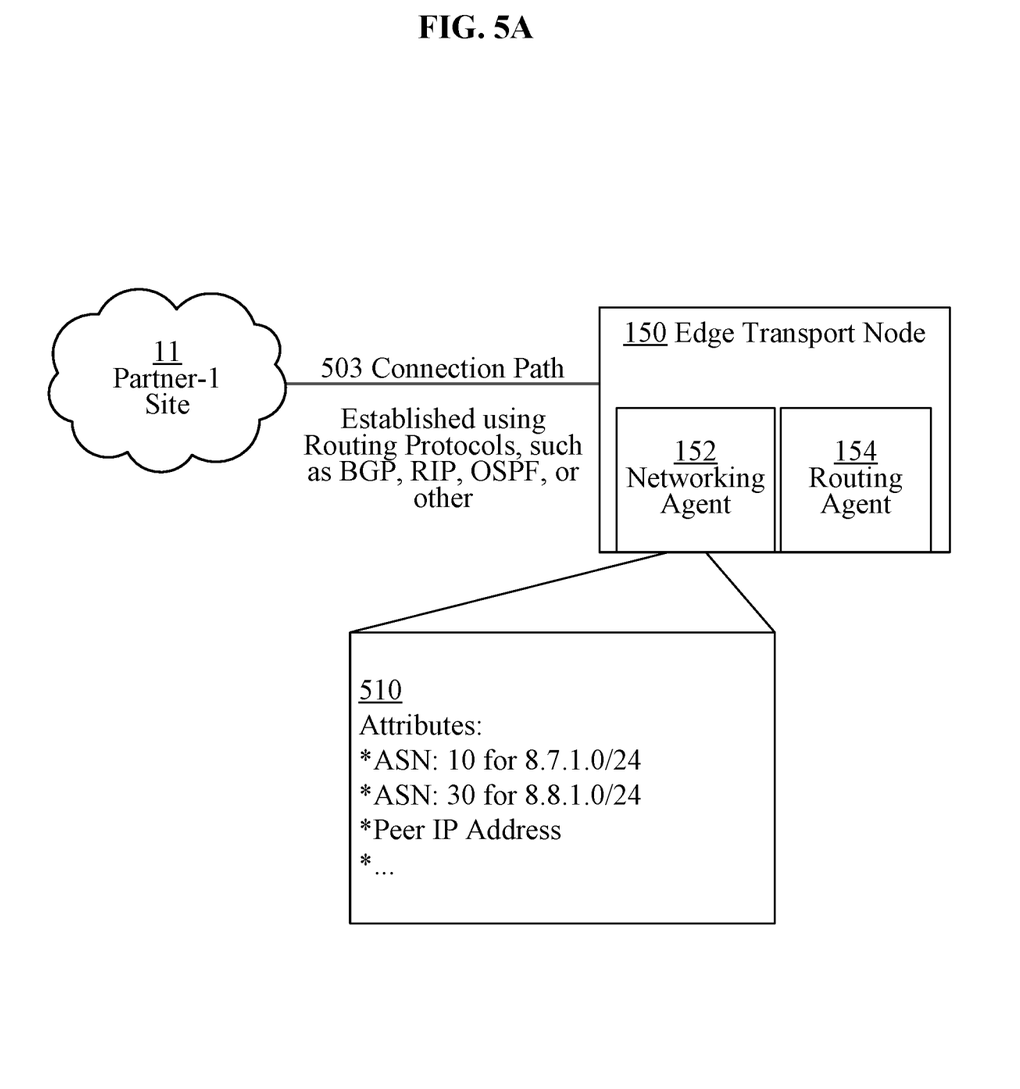
FIG. 5A is a diagram depicting an example approach for collecting runtime information from external entities.

FIG. 5A is a diagram depicting an example approach for collecting runtime information and attribute information from external partners and services. In the depicted example, edge transport node 150 receives configuration data for a communications connection with partner-1 site 11, and based on the received configuration data, establishes a connection path 503 with partner-1 site 11. Connection path 503 may be any type of path that is established using a communications protocol configured to collect information about attributes and subnets configured on external entities. Examples of such protocols include the BGP, RIP, and OSPF.

Once connection path 503 and a corresponding communications session are established, edge transport node 150 uses connection path 503 to collect attribute information 510 about, for example, prefixes used by partner-1 site 11. Then, edge transport node 150 notifies a group resolver about the prefixes and other attributes. Collected information/attributes 510 may include active service networks ("ASNs") and corresponding IP address subnets. In the depicted example, attributes 510 include an ASN 10 assigned to 8.7.1.0/24, an ASN 30 assigned to 8.8.1.0/24, a peer IP address, and the like.

Upon receiving the collected information/attributes, the group resolver tries to match the URI of the object and collected runtime attributes to the URI regular expression and other matching criteria in URI-based matching criteria created by a local security administrator. If a match is found, then the group resolver distributes the collected attributes associated with the matching name to transport nodes. For example, the group resolver may distribute the 8.7.1.0/24 associated with ASN 10 and the 8.8.1.0/24 associated with ASN 30 to a network agent 152 of edge transport node 150 to update the firewall rules and allow a routing agent 154 to properly route packets. The group resolver may also distribute the 8.7.1.0/24 associated with ASN 10 and the 8.8.1.0/24 associated with ASN 30 to a network agent 162 of datacenter 120 to update datapath 167 to allow proper routing of packets.

5.2. Time Chart

Figure 5B:
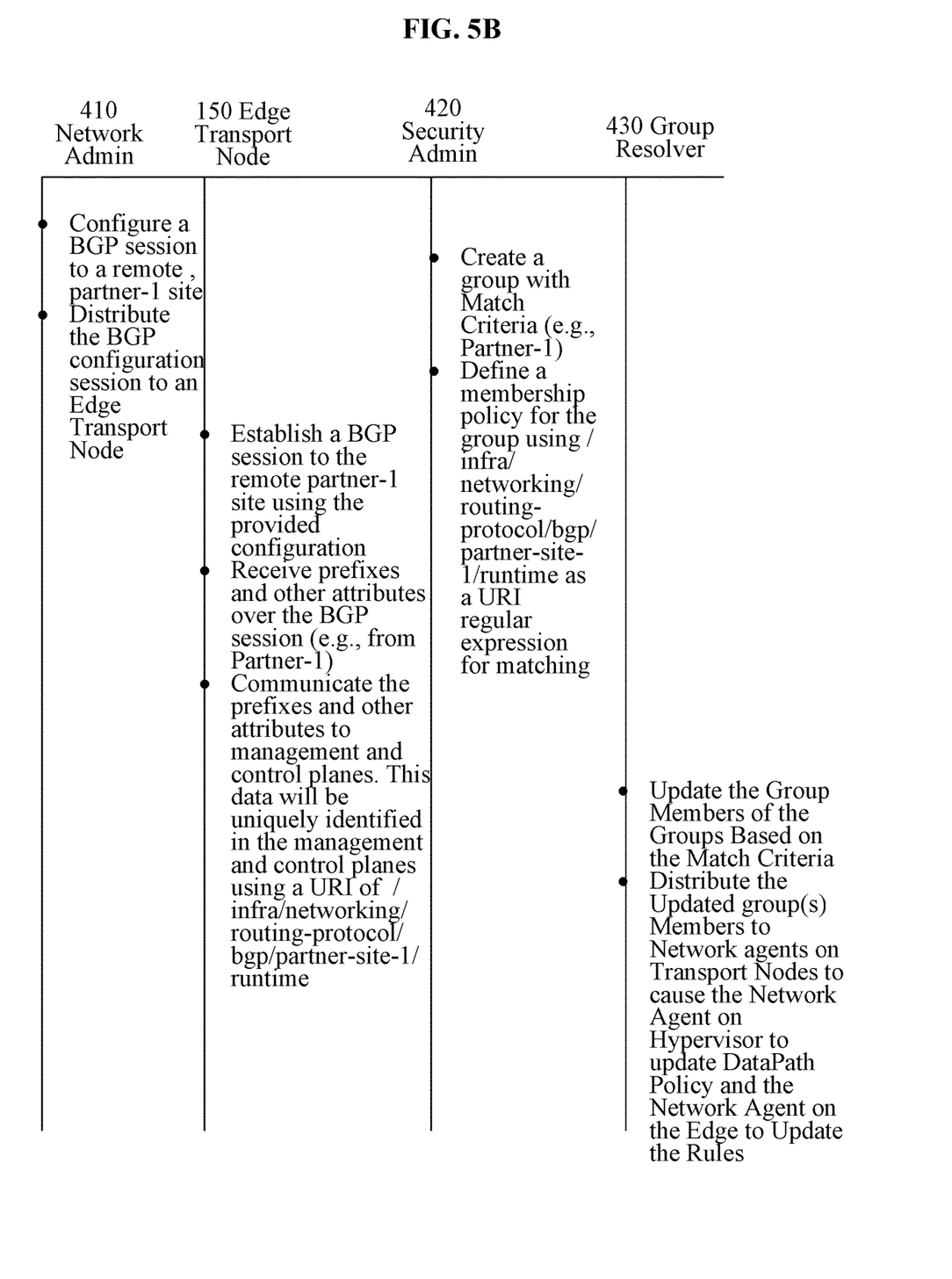
FIG. 5B is an example time chart for providing dynamic group membership support for external entities.

FIG. 5B is an example time chart for providing dynamic group membership support for external entities. The depicted time chart shows network administrator 410, edge transport node 150, security administrator 420 and group resolver 430 cooperating with each other to provide support for external memberships.

In an embodiment, network administrator 410 configures a BGP session to, for example, partner-1 site 11, and distributes the BGP configuration session to edge transport node 150.

Upon receiving the BGP session configuration information from network administrator 410, edge transport node 150 establishes a BGP session with partner-1 site 11 using the provided configuration information. Once the BGP session is established, edge transport node 150 uses the session to obtain the attributes of subnets implemented in partner-1 site 11. Upon receiving the attributes, edge transport node 150 transmits the attributes to group resolver 430.

Meanwhile, security administrator 420 creates a membership group and URI-based matching criteria for the group. Suppose that the URI is /infra/networking/routing-protocol/bgp/partner-site-1/runtime.

Group resolver 430 tries to find a match between the object identifiers of the attributes and the object identifiers included in the URI-based matching criteria. For example, since the attributes received from partner-1 site 11 correspond to the BGP session, they may be named "BGP Config Object." That object identifier matches the object identifier "BGP Config Object" in the URI-based matching criteria. Since the match is found, group resolver 430 distributes the attributes associated with the "BGP Config Object" to edge transport nodes. For example, group resolver 430 may distribute the attributes to a network agent implemented in a hypervisor to cause the network agent to update a datapath policy used by forwarding components of the hypervisor to forward packets.

Furthermore, group resolver 430 may distribute the attributes to a network agent implemented in edge transport node 150 to cause the network agent to update, for example, the firewall rules implemented in edge transport node 150.

As edge transport node 150 keeps receiving the new or updated attributes, edge transport node 150 keeps transmitting the new or updated attributes to group resolver 430, and group resolver 430 keeps trying to match the object identifiers of the attributes with the object identifiers in the URI-based matching criteria. If a match is found, then group resolver 430 distributes the updated attributes to the transport nodes.

Since the attributes are obtained from partner-1 site 11 dynamically, and since the attributes are transmitted to group resolver 430 dynamically, group resolver 430 dynamically distributes the attributes of partner-1 site 11 to transport nodes causing the nodes to dynamically update the group members and memberships. Hence, the approach provides dynamic membership group support for external groups and entities.

5.3. Flow Chart

Figure 5C:
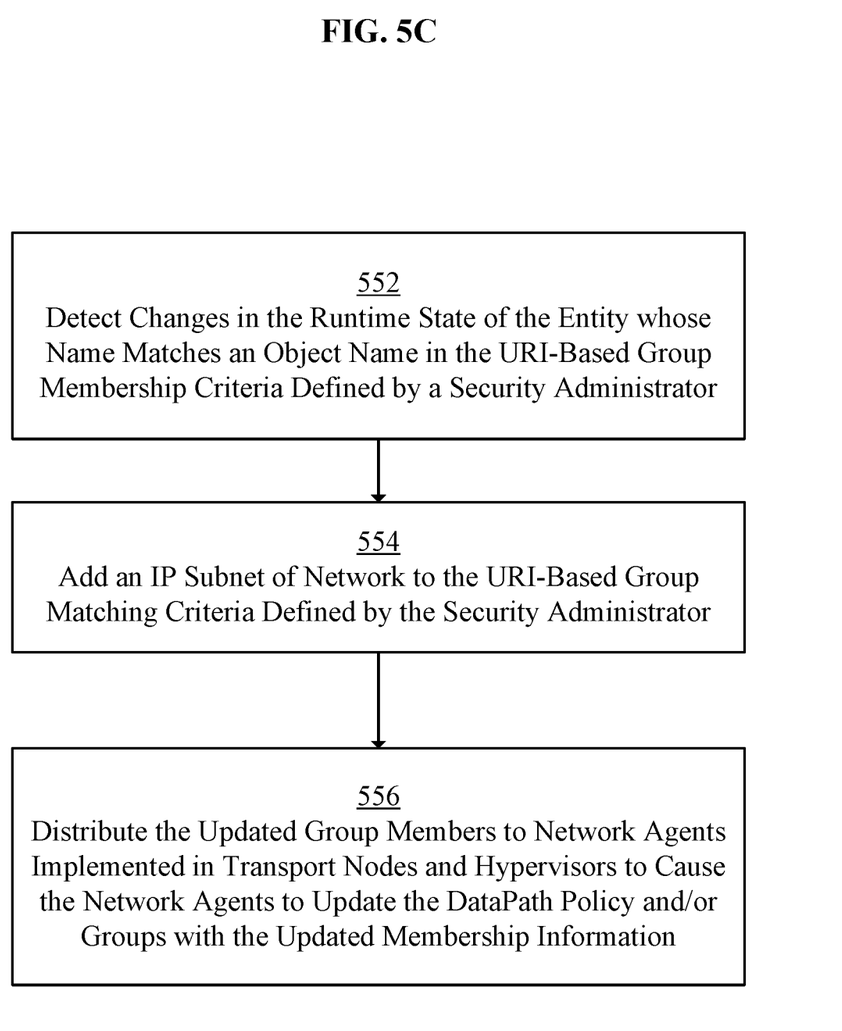
FIG. 5C is an example flow chart for dynamically supporting group memberships that are defined using runtime objects and based on information obtained using routing protocols.

FIG. 5C is an example flow chart for dynamically supporting group memberships that are defined using runtime objects and based on information obtained using routing protocols. In step 552, a group resolver detects changes in the runtime state of an entity that matches URI-based matching criteria defined by a security administrator.

Once the match is found, the group resolver adds, in step 554, to the URI-based matching criteria, the corresponding IP subnet(s) specified in the attributes of the changed network.

In step 556, the group resolver distributes the updated group members to network agents implemented in transport nodes, including a network agent implemented in an edge transport node and a network agent implemented in a hypervisor. Distributing the updated group members to the network agents, causes one network agent to update a datapath policy with the updated membership information and another network agent to update a firewall.

6. DYNAMIC GROUP MEMBERSHIP SUPPORT USING PREDEFINED OBJECTS

In an embodiment, a dynamic group membership approach provides support for membership groups that include external services represented by predefined objects. In this approach, both, the objects and the URI-based matching criteria referencing objects are predefined. Examples of the predefined object include S3 prefixes in a S3 prefix list that may be maintained by the AWS. A group resolver detects the updates and updates the membership groups according to the updates. For example, if an external service updates any of the S3 prefixes in its own S3 prefix list, then the group resolver detects the updates, and updates the corresponding URI-based matching criteria referencing objects based on the updates.

6.1. Time Chart

Figure 6A:
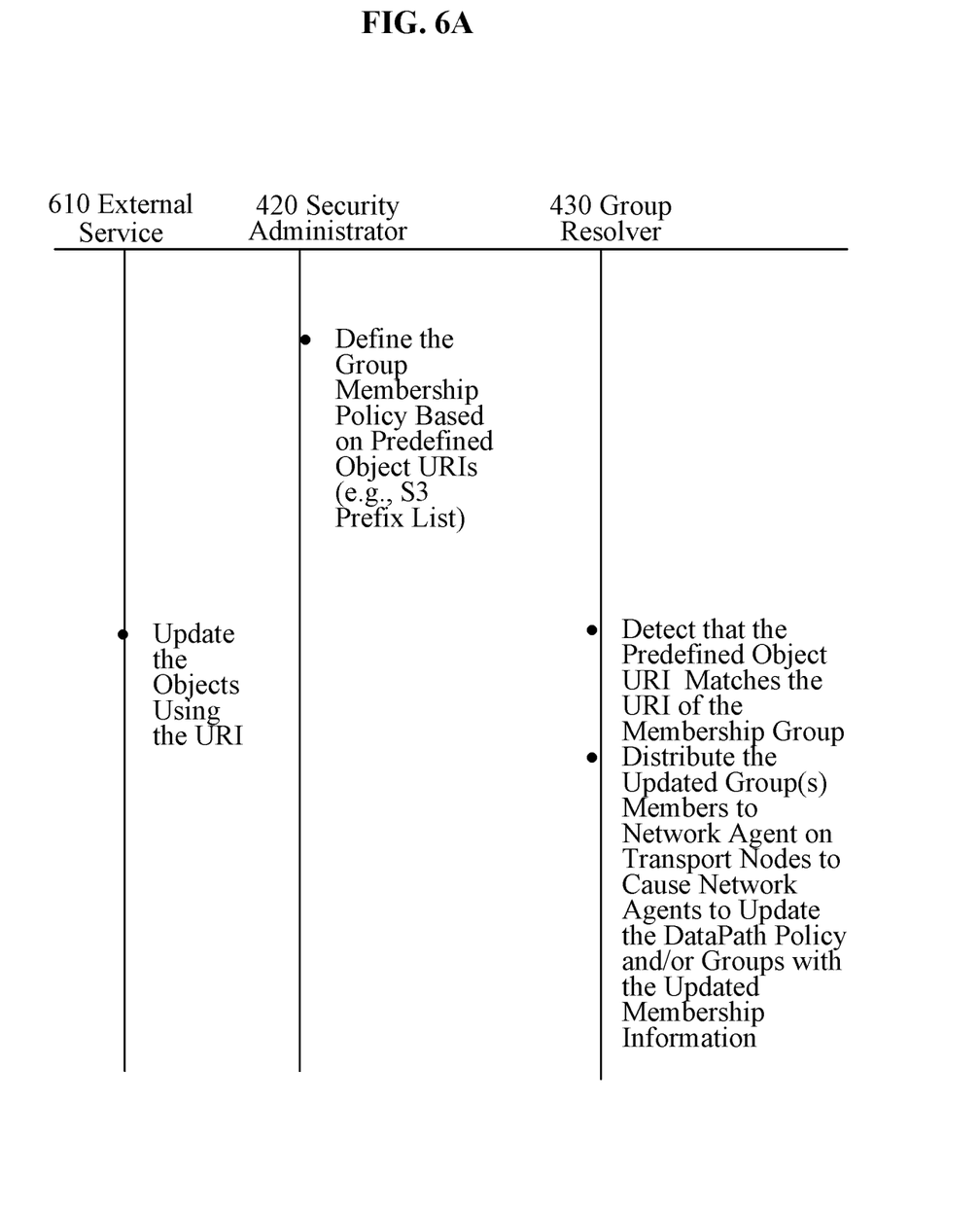
FIG. 6A is a time chart depicting example dynamic mechanisms for resource-path-based dynamic group membership support using predefined objects.

FIG. 6A is a time chart depicting example dynamic mechanisms for resource-path-based dynamic group membership support using predefined objects. In this example, security administrator 420 defines a group membership policy based on a predefined URI-based matching criteria object. Examples of the predefined objects may include prefixes listed in a S3 prefix list, explained before.

As external service 610 changes or is modified, external service 610 updates the objects using the corresponding URI objects. If the S3 prefix list is modified, and the modified S3 prefix list includes additional prefixes, then the corresponding changes are communicated to a management and control plane and then to group resolver 430.

In an embodiment, group resolver 430 determines whether the predefined object URI matches the URI-based matching criteria for a membership group. If group resolver 430 finds a match, then group resolver 430 updates the corresponding URI-based matching criteria that reference the objects. Then, group resolver 430 distributes the updated group member information to network agents executing in transport nodes to cause the network agents to update a datapath policy in a hypervisor and to update a firewall policy in an edge transport node.

6.2. Flow Chart

Figure 6B:
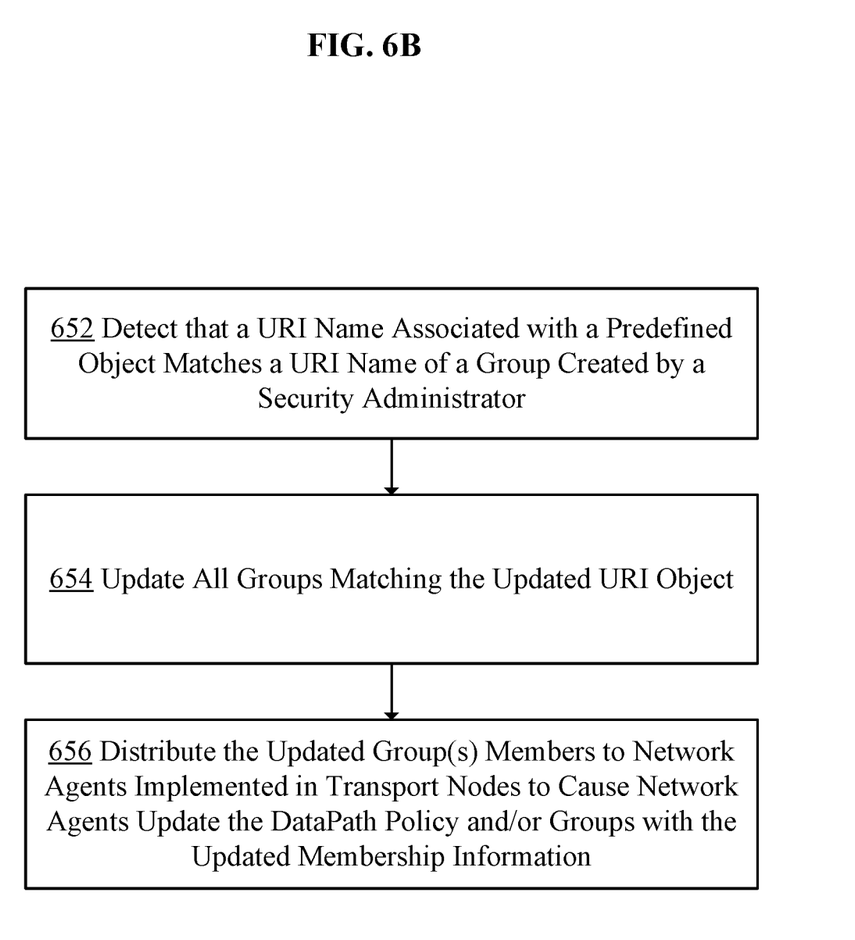
FIG. 6B is an example flow chart for dynamically supporting group memberships using predefined objects.

FIG. 6B is an example flow chart for dynamically supporting group memberships using predefined objects. In this approach, the objects are predefined by, for example, external entities, such as partners sites, and the URIs of the predefined objects are known. An external service such as a cloud service for a S3, may create and update the objects, which may correspond to S3 prefixes that are referred by the URIs. A security administrator may define the group membership policies using predefined URI-based matching criteria referencing objects.

In step 652, a group resolver detects that a URI object identifier associated with a predefined object matches an object identifier of a URI-based matching criteria referencing objects created by a security administrator. Using the matching information, the group resolver updates, in step 654, the URI-based matching criteria for the membership group.

In step 656, the group resolver distributes the updated group members to network agents implemented in transport nodes, including a network agent implemented in an edge transport node and a network agent implemented in a hypervisor. Distributing the updated membership policy to the network agents, causes the network agents to update a datapath policy with the updated membership information and update a firewall implemented in an edge transport node.

7. IMPROVEMENTS PROVIDED BY CERTAIN EMBODIMENTS

In an embodiment, an approach provides resource-path-based dynamic group membership support for membership groups. The membership groups may include local members, such as configuration objects defined by a network administrator, as well as external members, such as partner sites and external services. The approach allows to define and update the membership groups dynamically, without manual processing, and across local and external membership groups.

In an embodiment, an approach allows to create and update the membership groups automatically as the groups are created and modified. This is enabled by using URIs, which may be defined in advance or defined by security administrators as the administrators create the membership groups. The versatility of the URIs allows to manage the membership groups across the local and external objects.

8. IMPLEMENTATION DYNAMIC MECHANISMS

The present approach may be implemented using a computing system comprising one or more processors and memory. The one or more processors and memory may be provided by one or more hardware machines. A hardware machine includes a communications bus or other communication dynamic mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus and used for storing information and software instructions to be executed by a processor. Main memory may also be used for storing temporary variables or other intermediate information during execution of software instructions to be executed by one or more processors.

9. GENERAL CONSIDERATIONS

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

What is claimed is:

1. A computer-implemented method for providing dynamic mechanisms for resource-path-based, dynamic group membership support for local and external membership groups, the method comprising:

detecting, by a group resolver implemented in a management and control plane, that information about an object stored in the management and control plane was created or updated;

wherein the object represents any one of: a logical component implemented in a local datacenter, an attribute object created for an external entity, or an external service object created for an external service;

determining whether a Universal Resource Identifier ("URI") of the object matches a URI regular expression and other conditions specified in membership criteria created for a membership group;

in response to determining that the URI of the object matches the URI regular expression and other conditions specified in the membership criteria created for the membership group:

distributing the information about the object to one or more network agents implemented in one or more transport nodes to cause the one or more network agents to automatically update a group membership policy associated with the membership group; and wherein the group membership policy affects packet forwarding behavior of a forwarding node.

2. The computer-implemented method of claim 1, wherein the object is a configuration object representing a logical router created by a network administrator; and wherein the configuration object is associated with one or more IP subnets assigned to the logical router.

3. The computer-implemented method of claim 1, wherein the object is a partner site attribute object; wherein the partner site attribute object stores one or more attributes specific to the external entity; and wherein the one or more attributes are collected using functionalities of a routing protocol and over a communications connection established between an edge transport node and the external entity.

4. The computer-implemented method of claim 1, wherein the object is a predefined external service object corresponding to the external service provided by an external service entity; wherein the predefined external service object is updated by the external entity using an object URI; and wherein the object URI comprises a simple storage service ("S3") prefix list.

5. The computer-implemented method of claim 1, wherein the membership criteria specify one or more group members using a membership group name; and wherein the group resolver matches the URI of the object to the URI regular expression to determine one or more subnets that correspond to the one or more group members.

6. The computer-implemented method of claim 1, wherein the group resolver distributes the information about the object to a network agent implemented in a hypervisor to cause the network agent implemented in the hypervisor to update the group membership policy associated with the membership group.

7. The computer-implemented method of claim 1, wherein the group resolver distributes the information about the object to a network agent implemented in an edge transport node to cause the network agent implemented in the edge transport node to update one or more firewall rules associated with the membership group.

8. One or more non-transitory computer-readable storage media storing one or more computer instructions which, when executed by one or more processors, cause the one or more processors to perform:
- detecting, by a group resolver implemented in a management and control plane, that information about an object stored in the management and control plane was created or updated;
- wherein the object represents any one of: a logical component implemented in a local datacenter, an attribute object created for an external entity, or an external service object created for an external service;
- determining whether a Universal Resource Identifier ("URI") of the object matches a URI regular expression and other conditions specified in membership criteria created for a membership group;
- in response to determining that the URI of the object matches the URI regular expression and other conditions specified in the membership criteria created for the membership group:
  - distributing the information about the object to one or more network agents implemented in one or more transport nodes to cause the one or more network agents to automatically update a group membership policy associated with the membership group; and
  - wherein the group membership policy affects packet forwarding behavior of a forwarding node.

9. The one or more non-transitory computer-readable storage media of claim 8, wherein the object is a configuration object representing a logical router created by a network administrator; and wherein the configuration object is associated with one or more IP subnets assigned to the logical router.

10. The one or more non-transitory computer-readable storage media of claim 8, wherein the object is a partner site attribute object; wherein the partner site attribute object stores one or more attributes specific to the external entity; and wherein the one or more attributes are collected using functionalities of a routing protocol and over a communications connection established between an edge transport node and the external entity.

11. The one or more non-transitory computer-readable storage media of claim 8, wherein the object is a predefined external service object corresponding to the external service provided by an external service entity; wherein the predefined external service object is updated by the external entity using an object URI; and wherein the object URI comprises a simple storage service ("S3") prefix list.

12. The one or more non-transitory computer-readable storage media of claim 8, wherein the membership criteria specify one or more group members using a membership group name; and wherein the group resolver matches the URI of the object to the URI regular expression to determine one or more subnets that correspond to the one or more group members.

13. The one or more non-transitory computer-readable storage media of claim 8, wherein the group resolver distributes the information about the object to a network agent implemented in a hypervisor to cause the network agent implemented in the hypervisor to update the group membership policy associated with the membership group.

14. The one or more non-transitory computer-readable storage media of claim 8, wherein the group resolver distributes the information about the object to a network agent implemented in an edge transport node to cause the network agent implemented in the edge transport node to update one or more firewall rules associated with the membership group.

15. A group resolver implemented in a management and control plane in a computer network and configured to provide dynamic mechanisms for resource-path-based, dynamic group membership support for local and external membership groups, the group resolver comprising:
- one or more processors;
- one or more memory units; and
- one or more non-transitory computer-readable storage media storing one or more computer instructions which, when executed by the one or more processors, cause the one or more processors to perform:
  - detecting, by the group resolver implemented in the management and control plane, that information about an object stored in the management and control plane was created or updated;
  - wherein the object represents any one of: a logical component implemented in a local datacenter, an attribute object created for an external entity, or an external service object created for an external service;
  - determining whether a Universal Resource Identifier ("URI") of the object matches a URI regular expression and other conditions specified in membership criteria created for a membership group;
  - in response to determining that the URI of the object matches the URI regular expression and other conditions specified in the membership criteria created for the membership group:
    - distributing the information about the object to one or more network agents implemented in one or more transport nodes to cause the one or more network agents to automatically update a group membership policy associated with the membership group; and
    - wherein the group membership policy affects packet forwarding behavior of a forwarding node.

16. The group resolver of claim 15, wherein the object is a configuration object representing a logical router created by a network administrator; and wherein the configuration object is associated with one or more IP subnets assigned to the logical router.

17. The group resolver of claim 15, wherein the object is a partner site attribute object; wherein the partner site attribute object stores one or more attributes specific to the external entity; and wherein the one or more attributes are collected using functionalities of a routing protocol and over a communications connection established between an edge transport node and the external entity.

18. The group resolver of claim 15, wherein the object is a predefined external service object corresponding to the external service provided by an external service entity; wherein the predefined external service object is updated by the external entity using an object URI; and wherein the object URI comprises a simple storage service ("S3") prefix list.

19. The group resolver of claim 15, wherein the membership criteria specify one or more group members using a membership group name; and wherein the group resolver matches the URI of the object to the URI regular expression to determine one or more subnets that correspond to the one or more group members.

20. The group resolver of claim 15, wherein the group resolver distributes the information about the object to a network agent implemented in a hypervisor to cause the network agent implemented in the hypervisor to update the group membership policy associated with the membership group.

\* \* \* \* \*